(12) United States Patent
Hayashi

(10) Patent No.: US 11,015,959 B2
(45) Date of Patent: *May 25, 2021

(54) ENCODER AND CONTROL SYSTEM

(71) Applicant: FANUC CORPORATION, Yamanashi (JP)

(72) Inventor: Shinichirou Hayashi, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 135 days.

This patent is subject to a terminal disclaimer.

(21) Appl. No.: 16/204,508

(22) Filed: Nov. 29, 2018

(65) Prior Publication Data
US 2019/0170540 A1 Jun. 6, 2019

(30) Foreign Application Priority Data
Dec. 1, 2017 (JP) .............................. JP2017-231558

(51) Int. Cl.
*G01D 5/24* (2006.01)
*H04Q 9/04* (2006.01)
*G01D 5/244* (2006.01)
*G01D 21/00* (2006.01)

(52) U.S. Cl.
CPC ..... *G01D 5/24476* (2013.01); *G01D 5/24495* (2013.01); *G01D 21/00* (2013.01); *H04Q 9/04* (2013.01)

(58) Field of Classification Search
CPC .......... G01D 5/24476; G01D 5/24495; G01D 21/00; G01D 5/24457; G01D 5/24461; G01D 5/347; G01D 5/14; H04Q 9/04; G05B 19/0423; G06F 11/076

USPC ........................................................ 702/150
See application file for complete search history.

(56) References Cited

U.S. PATENT DOCUMENTS

| | | | |
|---|---|---|---|
| 5,721,546 A * | 2/1998 | Tsutsumishita | .... G01D 5/24409 341/116 |
| 6,639,529 B1 | 10/2003 | Jansson | |
| 7,116,252 B2 | 10/2006 | Teraguchi | |
| 9,036,285 B2 | 5/2015 | Kato | |
| 9,586,319 B2 | 3/2017 | Asada | |
| 10,146,218 B2 | 12/2018 | Tanaka et al. | |
| 2014/0299754 A1* | 10/2014 | Okada | ................... G01B 11/26 250/231.1 |

(Continued)

FOREIGN PATENT DOCUMENTS

| CN | 1135038 A | 11/1996 |
|---|---|---|
| CN | 1712889 A | 12/2005 |
| CN | 104236494 A | 12/2014 |

(Continued)

*Primary Examiner* — Michael P Nghiem
(74) *Attorney, Agent, or Firm* — RatnerPrestia

(57) ABSTRACT

A control system in which an encoder and a controller are connected by serial communication. The encoder includes a data transmission unit configured to: embed, in serial data, position information which is information related to a position of a detection object, and position information generation timing information that indicates a timing at which the position information is generated; and transmit to the controller the serial data. The controller includes a correction unit configured to correct, based on the position information and the position information generation timing information received from the encoder, the position information of the detection object.

2 Claims, 5 Drawing Sheets

(56) References Cited

U.S. PATENT DOCUMENTS

| | | | |
|---|---|---|---|
| 2017/0106647 A1* | 4/2017 | Inoue | B41J 2/04505 |
| 2020/0096365 A1* | 3/2020 | Hayashi | G01D 5/00 |

FOREIGN PATENT DOCUMENTS

| | | | |
|---|---|---|---|
| CN | 105905132 A | 8/2016 | |
| CN | 106406254 A | 2/2017 | |
| JP | 08-261794 A | 10/1996 | |
| JP | H10301630 A | 11/1998 | |
| JP | 2002341943 A | 11/2002 | |
| JP | 2003329485 A | 11/2003 | |
| JP | 2012183606 A | 9/2012 | |

\* cited by examiner

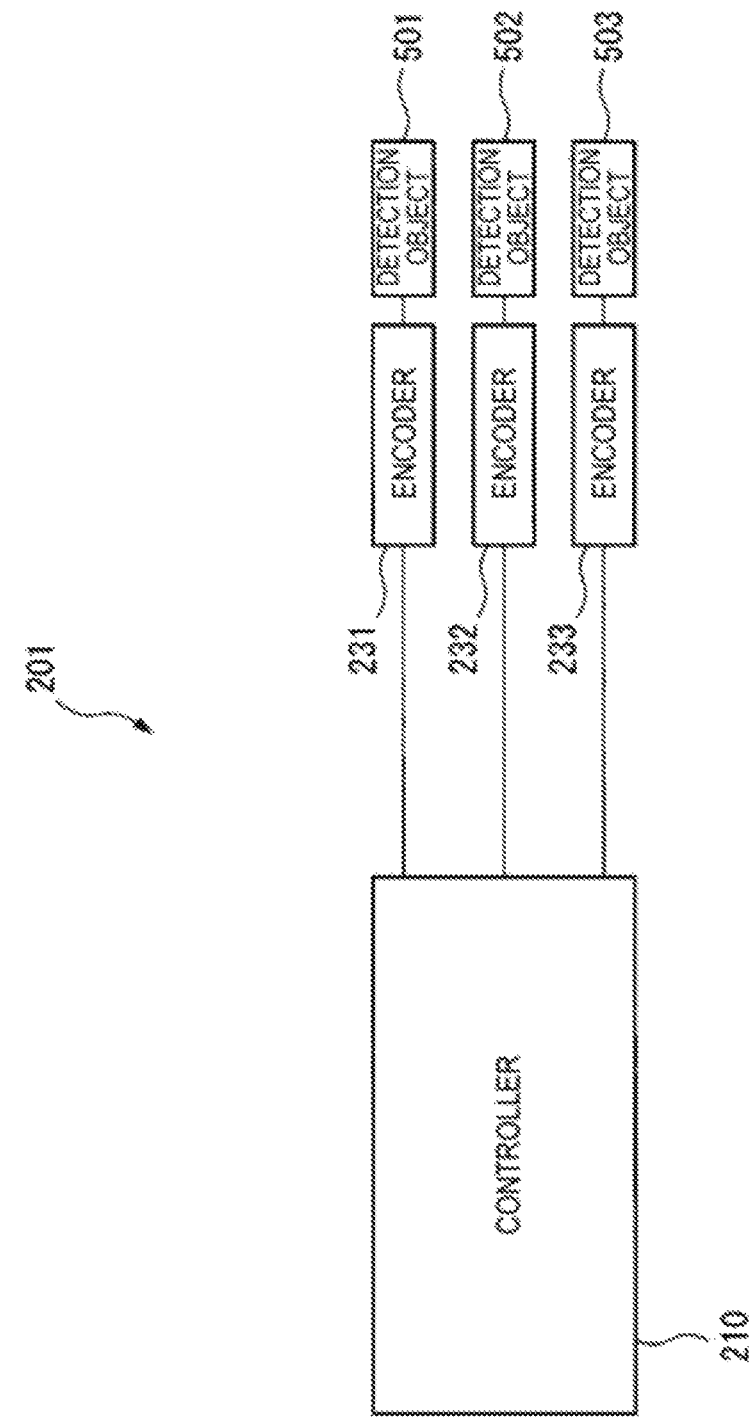

ENCODER AND CONTROL SYSTEM

CROSS-REFERENCE TO RELATED APPLICATION

This application is a new U.S. Patent Application that claims benefit of Japanese Patent Application No. 2017-231558, filed Dec. 1, 2017, the disclosure of this application is being incorporated herein by reference in its entirety for all purposes.

BACKGROUND OF THE INVENTION

1. Field of the Invention

The present invention relates to an encoder and a control system including an encoder.

2. Description of the Related Art

Encoders for detecting the rotational position of a rotation shaft and the movement position of a linearly moving object are known (for example, see JP8-261794 A). JP8-261794 A discloses: "providing a storage device 10 for keeping detected angle data and an output correction device 11 for correcting a delay time; estimating, by the output correction device 11, a movement amount in the delay time, due to an A/D conversion, operation processing time or the like, from the angle data of the present sampling and past angle data; and adding the estimated movement amount to the present sampling data to correct the delay time."

SUMMARY OF THE INVENTION

In control systems in which an encoder and a controller perform serial communication, however, since a certain amount of time is required for the communication process of transmitting position information embedded in serial data from the encoder to the controller, the position of a detection object may have advanced, at the time when the controller side acquires the position information from the encoder, beyond the position indicated by the received position information. Accordingly, in order to obtain a more accurate position of the detection object at the present time, it is necessary to correct the position information. Here, a common method to correct the position information includes obtaining, based on the position information received multiple times so far, a correction amount corresponding to the communication delay time from the time when the controller requests the position information from the encoder until the time when the position information transmitted from the encoder arrives. In cases that the timing from when the encoder receives the position information request to when the position information is generated depends on the encoder, however, accurate correction cannot be performed on the position information using the above-described correction method.

One aspect of the present disclosure relates to a control system in which an encoder and a controller are connected by serial communication, the encoder including a data transmission unit configured to: embed, in serial data, position information which is information related to a position of a detection object, and position information generation timing information that indicates a timing at which the position information is generated; and transmit the serial data to the controller, and the controller including a correction unit configured to correct, based on the position information and the position information generation timing information received from the encoder, the position information of the detection object.

Another aspect of the present disclosure relates to an encoder connected to a controller to be capable of serial communication with the controller, the encoder including a data transmission unit configured to: embed, in serial data, position information which is information related to a position of a detection object, and position information generation timing information that indicates a timing at which the position information is generated; and transmit the serial data to the controller.

BRIEF DESCRIPTION OF THE DRAWINGS

The objects, features and advantages of the present invention will become more apparent from the following description of the embodiments in connection with the accompanying drawings, wherein: In the accompanying Figures, FIG. 7 is a block diagram illustrating a configuration example of a control system in which a plurality of encoders are connected to a controller.

DETAILED DESCRIPTION

Figure 1:
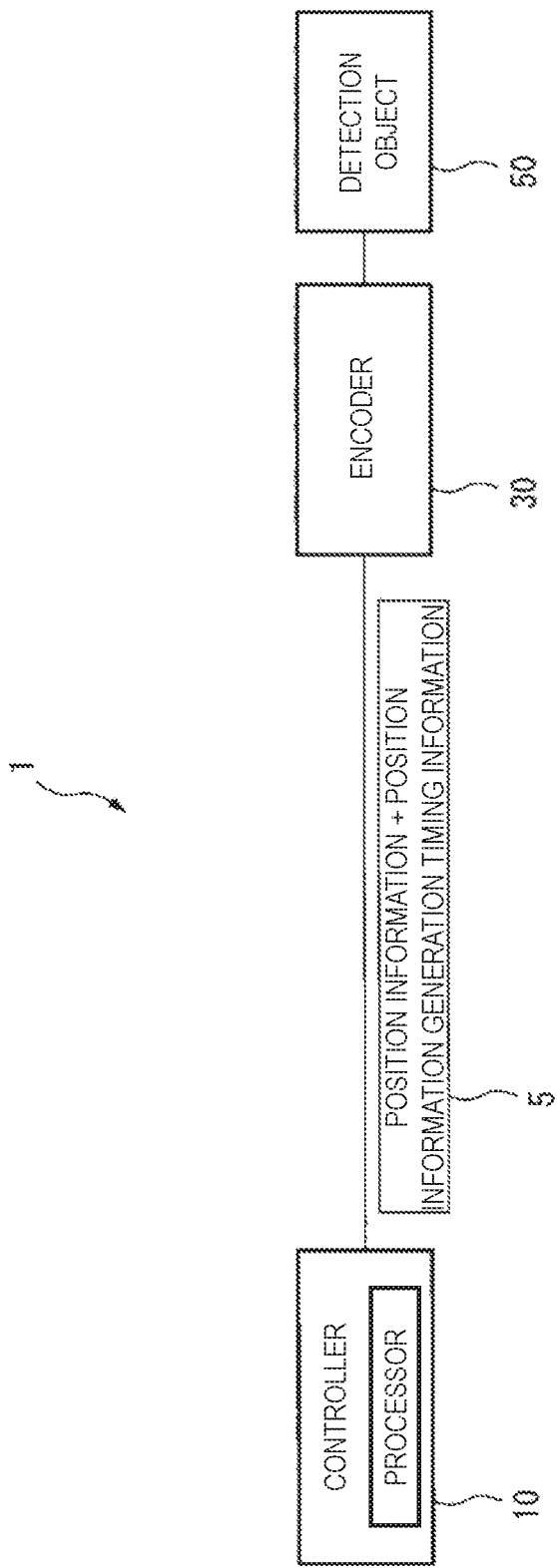
FIG. 1 is a block diagram schematically illustrating an overall configuration of a control system according to an embodiment of the present invention.

Embodiments of the present invention will be described below with reference to the accompanying drawings. Throughout the drawings, corresponding components are designated by common reference numerals. To facilitate understanding, the scale of the Figures is appropriately changed. Note that modes illustrated in the Figures are merely examples to implement the present invention, and the present invention is not limited to the modes illustrated.

FIG. 1 is a block diagram schematically illustrating an overall configuration of a control system 1 according to an embodiment of the present invention. The control system 1 is a system configured to control, based on position information that indicates the position of a detection object 50 detected by an encoder 30, the operation of the detection object 50 under the control of a controller 10. The control system 1 is, for example, a system for controlling a spindle motor of a machine tool. In this case, the detection object 50 is a motor, and the encoder 30 is provided with a sensor for detecting the rotational position of the motor. The controller 10 and the encoder 30 are configured to be capable of communicating with each other by serial communication, and the position information of the detection object 50 detected by the encoder 30 is transmitted as serial data 5 from the encoder 30 to the controller 10. In addition, as will be described in detail below, the encoder 30 is configured to generate position information generation timing information that indicates the timing at which the position information was generated, embed it in the serial data 5 together with the position information, and transmit the serial data 5 to the controller 10. The controller 10 is configured to be able to calculate the accurate position of the detection object 50 at the present time by correcting the position information based on the position information generation timing information.

Figure 2:
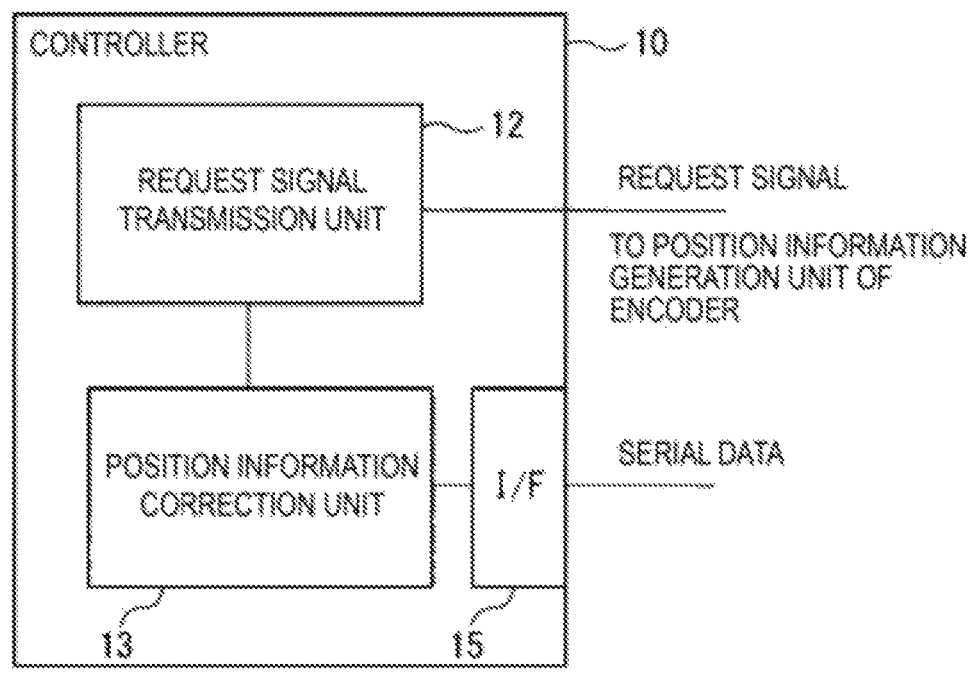
FIG. 2 is a block diagram schematically illustrating the configuration of a controller in the control system of FIG. 1.

FIG. 2 is a block diagram illustrating the configuration of the controller 10. It should be noted that, among the various functions of the controller 10, FIG. 2 illustrates functions of serial communication with the encoder 30 and position information correction. As illustrated in FIG. 2, the controller 10 includes a request signal transmission unit 12 configured to transmit, to the encoder 30, a request signal that requests the position information, and a position information correction unit 13 configured to correct the position information based on the position information and the position information generation timing information received as the serial data from the encoder 30. The exchange of serial data between the position information correction unit 13 and the encoder 30 is performed via a serial interface 15. The request signal transmission unit 12 may generate the request signal intermittently or periodically, for example. Details of the functions of the request signal transmission unit 12 and the position information correction unit 13 will be described later.

Figure 3:
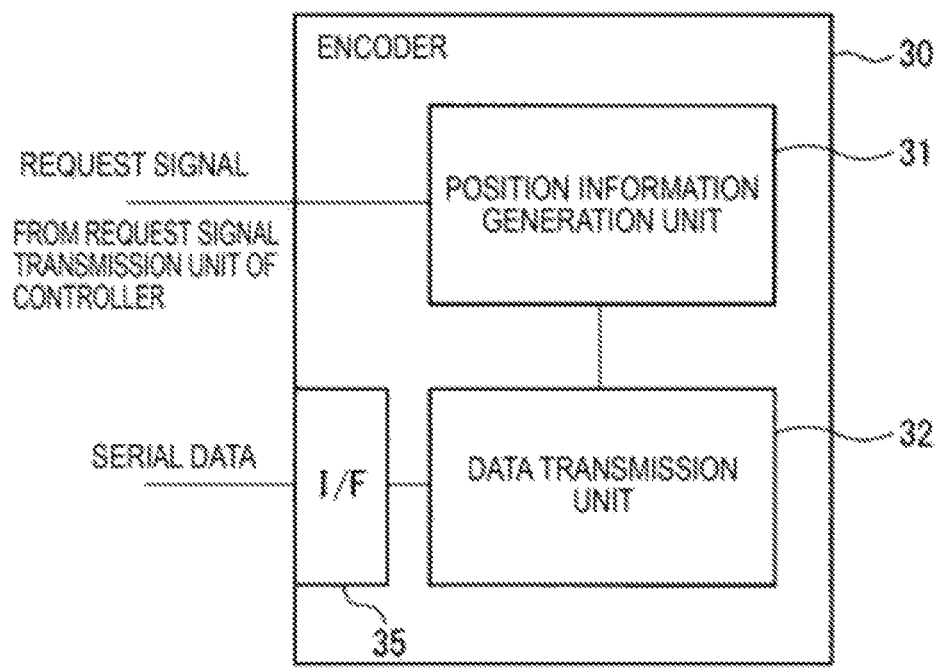
FIG. 3 is a block diagram illustrating the configuration of an encoder in the control system of FIG. 1.

FIG. 3 is a block diagram illustrating the configuration of the encoder 30. As illustrated in FIG. 3, the encoder 30 includes a positional information generation unit 31 configured to generate position information that indicates the position of the detection object 50 in response to a request signal from the request signal transmission unit 12 of the controller 10 and a data transmission unit 32 configured to embed the position information and the position information generation timing information generated by the position information generation unit 31 in the serial data, and transmit the serial data to the controller 10. The exchange of serial data between the data transmission unit 32 and the controller 10 is performed via a serial interface 35. Details of the position information generation unit 31 and the data transmission unit 32 will be described later.

Figure 4:
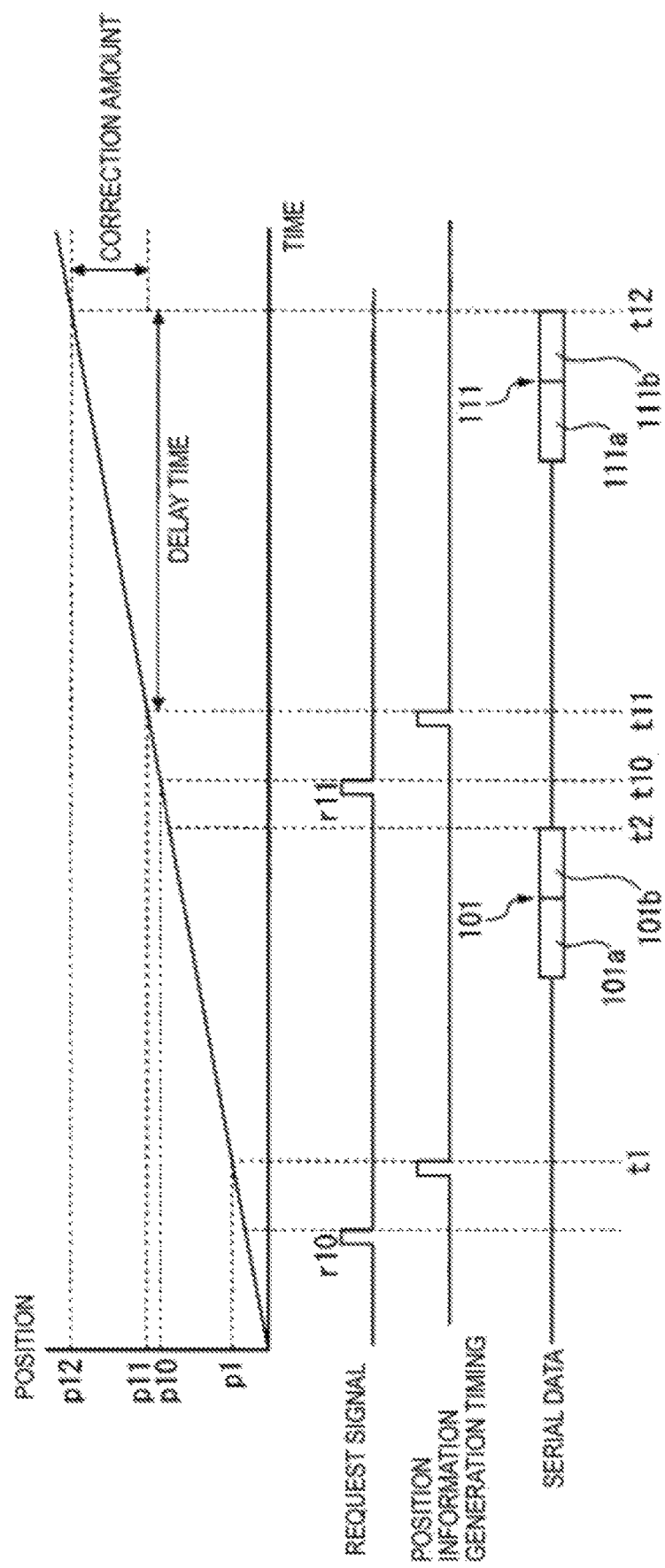
FIG. 4 is a time chart illustrating a request signal, a position information generation timing, and serial data timing.

Next, correction of the position information will be described with reference to the time chart of FIG. 4. FIG. 4 illustrates the timing at which the controller 10 transmits the request signal, the timing at which the encoder 30 generates the position information (position information generation timing), and the timing at which the controller 10 receives the serial data. It should be noted that, since the timing at which the controller 10 transmits the request signal and the timing at which the encoder 30 receives the request signal can be regarded as substantially the same, the explanation below is made with the assumption that they are the same. On the upper side of FIG. 4, the position of the detection object 50 that increases with the passage of time is depicted as a graph. Here, the encoder 30 generates the position information 111a at the timing t11 in response to the request signal r11 received from the controller 10 at timing t10, and the controller 10 receives the serial data 111 that embeds the position information 111a and the position information generation timing information 111b (information indicating the timing t11 at which the position information 111a is generated) at timing t12. In the present embodiment, as an example, the controller 10 and the encoder 30 operate based on internal clock pulses of sufficiently high speed in comparison with the rate of the serial communication and of the same period. As the position information generation timing information, the encoder 30 generates a count value of the internal clock pulse corresponding to the period from when the request signal is received to when the position information is generated. In this case, since the controller 10 operates based on an internal clock of the same period as that of the encoder 30, the length of the period from the reception of the request signal r11 to the generation of the position information 111a can be recognized based on the count value received as the position information generation timing information 111b from the encoder 30.

With respect to the position p10 of the detection object at the timing t10 when the controller 10 transmits the request signal r11, at the timing t12 (the present time) when the controller 10 receives the position information 111a, the position of the detection object 50 has advanced to the position p12. Accordingly, in order to recognize the accurate position of the detection object 50 at the present time t12, it is necessary for the controller 10 to correct the position information 111a embedded in the received serial data 111. Here, the encoder 30 according to the present embodiment embeds, in the serial data 111, the position information generation timing information 111b that indicates the timing t11 at which the position information (position p11) is generated. Accordingly, the controller 10 can obtain the position p11, which is the accurate position of the detection object 50 at the timing t11, from the serial data 111.

Here, as illustrated in FIG. 4, assume that t1 depicts the timing at which the encoder 30 generates the position information 101a in response to the transmission of the request signal r10 requesting the position information 101a at the previous time, and the position p1 depicts the position of the detection object 50 at the timing t1. The position information 101a that indicates the position p1 and the position information generation timing information 101b that indicates the timing t1 are embedded in the serial data 101 received at the previous time. Accordingly, the position information correction unit 13 of the controller 10 can obtain the accurate movement speed of the detection object 50 with the following expression.

(Movement speed)=(previous position $p1$–present position $p11$)/(previous position information generation timing $t1$–present position information generation timing $t11$)

In addition, the delay time from the timing t11 at which the position information 111a provided by the serial data 111 was generated to the timing t12 (the present time) can be obtained with the following expression.

(Delay time)=(timing $t12$ when the controller receives the serial data)–(position information generation timing $t11$)

Based on the "movement speed" and the "delay time" obtained as illustrated above, the position information correction unit 13 of the controller 10 can obtain the correction amount for the position information 111a acquired at the timing t12 with the following expression.

(Correction amount)=(Movement speed)×(Delay time)

By adding the "correction amount" calculated as described above to the position information (position p11) received at the timing t12, the position information correction unit 13 of the controller 10 can obtain the accurate position information (position p12) of the detection object 50 at the present time.

Figure 5:
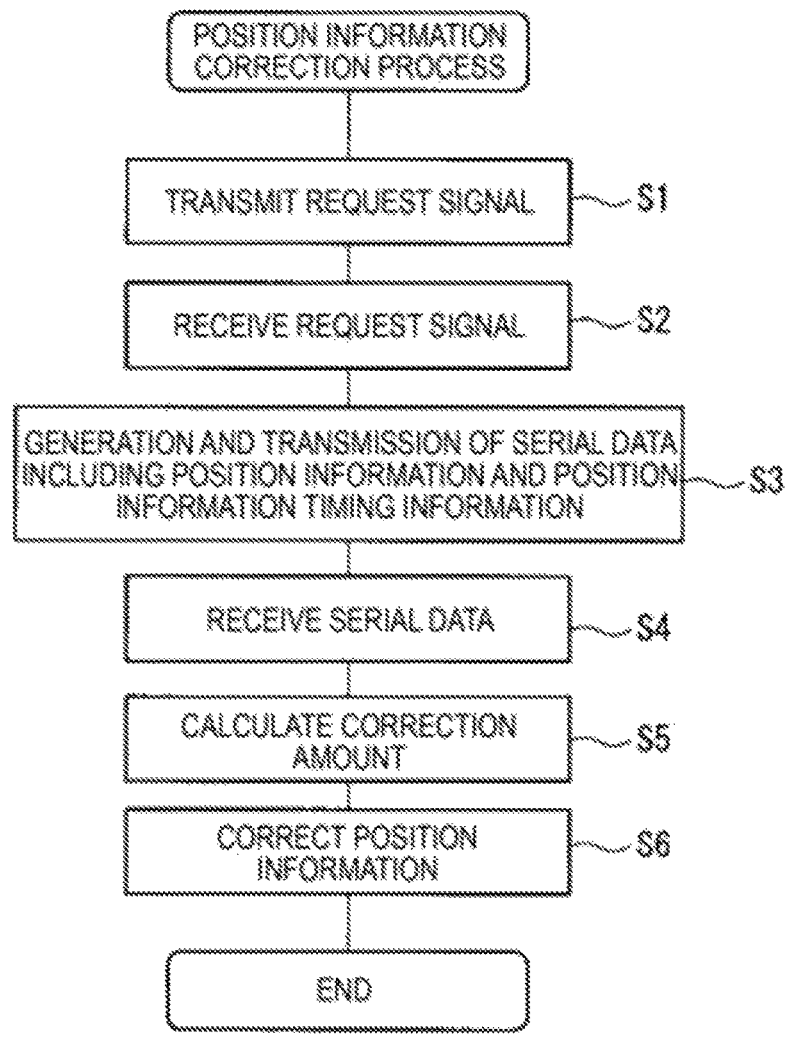
FIG. 5 is a flowchart illustrating a position information correction process by the control system of FIG. 1.
Figure 6:
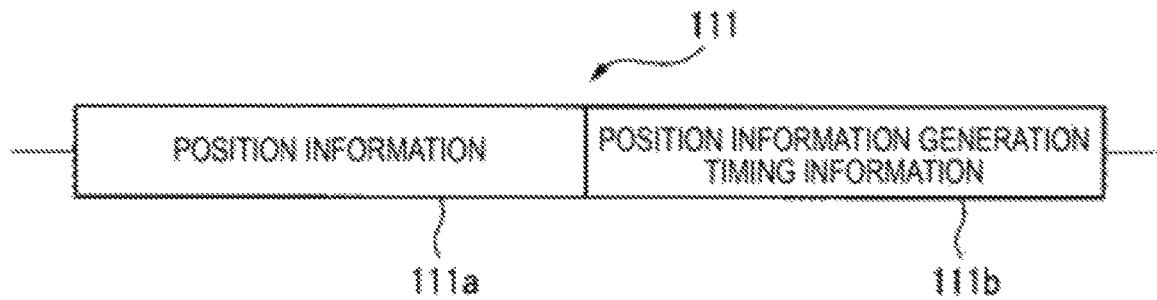
FIG. 6 is a diagram illustrating a configuration example of a frame of serial data.

FIG. 5 is a flowchart illustrating the position information correction process in the control system 1 described above. The operation flow in the control system will be described with reference to FIG. 5. First, when the request signal transmission unit 12 of the controller 10 transmits the position information request signal (Step S1), the encoder 30 receives the request signal (Step S2). In response to the reception of the request signal, the encoder 30 generates the position information, generates the serial data embedding the position information and the position information generation timing information, and transmits the serial data to the controller 10 (Step S3). FIG. 6 illustrates a configuration example of a frame of the serial data generated here. It should be noted that, in FIG. 6, the reference numerals used for the serial data 111 are used. As illustrated in FIG. 6, the position information 111a and the position information generation timing information 111b are arranged side by side in one frame of the serial data 111.

Upon receiving the serial data (Step S4), the controller 10 calculates the correction amount for the position information according to the above-described expression (Step S5). Then, by adding the correction amount calculated in Step S5 to the position information received in Step S4, the controller 10 acquires the accurate position of the detection object 50 at the present time (Step S6). It should be noted that the position information correction process of FIG. 5 may be performed intermittently or periodically, for example. The processing on the controller side that corresponds to the flowchart in FIG. 5 may be implemented by a program executable by the processor of the controller 10, and the program may be stored in a memory (not shown) of the controller 10 (or recording medium).

As described above, according to the present embodiments, since the position information generation timing information is embedded in addition to the position information in the serial data output by the encoder 30, the controller 10 may obtain the accurate position of the detection object at the present time, and the degree of accuracy of control of the detection object can be improved.

While the invention has been described with reference to specific embodiments, it will be understood, by those skilled in the art, that various changes or modifications may be made thereto without departing from the scope of the following claims.

The control system of the above embodiments can be applied to operations based on the detection of the position of various detection objects other than electric motors, such as linear moving objects or the like that serve as the detection object 50. That is, the encoder 30 may be configured as various types of encoders such as a rotary encoder or a linear encoder.

For example, the configurations described in the above embodiments can be applied to a control system having a configuration in which a plurality of encoders are connected to a controller. As an example, FIG. 7 illustrates a configuration example of a control system 201 in which three encoders 231, 232, and 233 are connected to a controller 210. It should be noted that detection objects 501, 502, and 503 are respectively connected to the encoders 231, 232, and 233. In the configuration of FIG. 7, the controller 210 is configured to independently control the encoders 231, 232, and 233 in a manner similar to that of the embodiments described above. According to this configuration, it is possible to appropriately correct the position information with respect to the three encoders 231, 232, and 233, which each have different position information generation timings. For this reason, even in a control system having a plurality of encoders which have different position information generation timings, the degree of accuracy of control can be improved.

In addition, in order to solve the problems of the present disclosure, various aspects and effects thereof as described below can be provided. It should be noted that the numbers in parentheses in the description of the following aspects correspond to the reference numerals in the Figures of the present disclosure.

For example, a first aspect of the present disclosure relates to a control system in which an encoder (30) and a controller (10) are connected by serial communication, the encoder (30) having a data transmission unit (32) configured to: embed, in serial data, position information which is information related to a position of a detection object, and position information generation timing information that indicates a timing at which the position information is generated; and transmit the serial data to the controller, and a controller (10) having a correction unit (13) configured to correct, based on the position information and the position information generation timing information received from the encoder, the position information of the detection object. According to the above-described first aspect, the controller may obtain an accurate position of the detection object at the present time, and the degree of accuracy of control of the detection object can be improved.

In addition, a second aspect of the present disclosure relates to the control system according to the first aspect, wherein the controller (10) further includes a request signal transmission unit (12) configured to transmit, to the encoder (30), a request signal that requests the position information; and the encoder (30) further includes a position information generation unit (31) configured to generate the position information in response to receiving the request signal from the controller (10) and to generate, as the position information generation timing information, information that indicates a generation timing of the position information with reference to reception of the request signal.

In addition, a third aspect of the present disclosure relates to the control system according to the second aspect, wherein the controller (10) is configured to transmit the request signal to the encoder (30) a plurality of times in a time series manner, and the correction unit (13) is configured to: calculate a movement speed of the detection object using the position information received a plurality of times; calculate, with reference to the position information generation timing information received at a present time, a delay time of the serial communication; and obtain, using the movement speed and delay time calculated, a correction amount for the position information received at the present time.

In addition, a fourth aspect of the present invention relates to the control system according to the third aspect, wherein:

when the position information and the position information generation timing information received by the controller from the encoder as a result of the request signal transmission unit transmitting the request signal at the present time are respectively defined as position p11 and timing t11, and the position information and the position information generation timing information received by the controller from the encoder as a result of the request signal transmission unit transmitting the request signal at a previous time are respectively defined as position p1 and timing t1, the correction unit (13) of the controller (10) obtains the movement speed of the detection object by movement speed=$(p1-p11)/(t1-t11)$;

when a reception timing of the serial data received from the encoder at the present time is defined as t12;

the correction unit (13) of the controller (10) obtains the delay time of the serial communication by delay time=$t12-t11$; and the correction unit (13) of the controller (10) obtains, based on the movement speed and the delay time obtained, the correction amount to be added to the position information received at the present time by correction amount=movement speed×delay time.

In addition, a fifth aspect of the present invention relates to an encoder (30) connected to a controller (10) to be capable of serial communication with the controller (10), the encoder (30) including a data transmission unit (32) configured to: embed, in serial data, position information which is information related to a position of a detection object, and position information generation timing information that indicates a timing at which the position information is generated; and transmit the serial data to the controller (10). According to the above-described fifth aspect, the controller may obtain an accurate position of the detection object at the present time, and the degree of accuracy of control of the detection object can be improved.

In addition, a sixth aspect of the present invention relates to the encoder (30) according to the fifth aspect, which further includes a position information generation unit (31) configured to generate the position information in response to receiving, from the controller (10), a request signal that requests the position information, and to generate, as the position information generation timing information, information that indicates a generation timing of the position information with reference to reception of the request signal.

The invention claimed is:

1. A control system in which an encoder and a controller are connected by serial communication,
the encoder including an encoder processor configured to:
  generate position information, which is information related to a position of a detection object, in response to receiving a request signal from the controller, and generate position information generation timing information which indicates a generation timing of the position information with reference to reception of the request signal; and
  embed, in serial data, the position information and the position information generation timing information; and
  transmit the serial data to the controller, and
the controller including a controller processor configured to:
  transmit, to the encoder, the request signal that requests the position information;
  correct, based on the position information and the position information generation timing information received from the encoder, the position information of the detection object;
  transmit the request signal to the encoder a plurality of times in a time series manner;
  calculate a movement speed of the detection object using the position information received a plurality of times;
  calculate, with reference to the position information generation timing information received at a present time, a delay time of the serial communication; and
  obtain, using the movement speed and the delay time calculated, a correction amount for the position information received at the present time.

2. The control system according to claim 1, wherein:
when the position information and the position information generation timing information received by the controller from the encoder as a result of the controller processor transmitting the request signal are respectively defined as position p11 and timing t11, and the position information and the position information generation timing information received by the controller from the encoder as a result of the controller processor transmitting the request signal are respectively defined as position p1 and timing t1,
the controller processor obtains the movement speed of the detection object by movement speed=(*p*1−*p*11)/(*t*1−*t*11);

when a reception timing of the serial data received from the encoder as a result of the controller processor transmitting the request signal is defined as t12,
the controller processor obtains the delay time of the serial communication by delay time=*t*12−*t*11;

and
the controller processor obtains, based on the movement speed and the delay time obtained, the correction amount to be added to the position information received by correction amount=movement speed×delay time.

* * * * *